(12) United States Patent
Tomczak et al.

(10) Patent No.: US 10,386,382 B2
(45) Date of Patent: Aug. 20, 2019

(54) WHEEL SPEED SENSOR

(71) Applicant: FORD GLOBAL TECHNOLOGIES, LLC, Dearborn, MI (US)

(72) Inventors: Peter Tomczak, Boppard (DE); Hicham Saleh, Nuremberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/051,668

(22) Filed: Aug. 1, 2018

(65) Prior Publication Data

US 2019/0041418 A1    Feb. 7, 2019

(30) Foreign Application Priority Data

Aug. 7, 2017 (DE) .................. 10 2017 213 642

(51) Int. Cl.
  *G01P 1/02* (2006.01)
  *G01P 3/481* (2006.01)
  *B60C 19/00* (2006.01)

(52) U.S. Cl.
  CPC .............. *G01P 1/026* (2013.01); *B60C 19/00* (2013.01); *G01P 3/481* (2013.01); *B60C 2019/004* (2013.01)

(58) Field of Classification Search
  CPC .......... G01P 1/026; G01P 3/481; B60C 19/00; B60C 2019/004
  See application file for complete search history.

(56) References Cited

U.S. PATENT DOCUMENTS

| 4,461,531 A * | 7/1984 | Davis .................... H01R 43/26 439/843 |
| 2003/0047014 A1 | 3/2003 | Stagg et al. |
| 2005/0079762 A1* | 4/2005 | Hsia .................... H01R 9/0521 439/578 |
| 2006/0019510 A1* | 1/2006 | Rudduck ............... F16B 1/0014 439/74 |
| 2008/0119073 A1* | 5/2008 | Thelen .................. H01R 13/748 439/131 |
| 2008/0202235 A1 | 8/2008 | Laps et al. |
| 2012/0112742 A1* | 5/2012 | Schrader .............. G01D 11/245 324/252 |

(Continued)

FOREIGN PATENT DOCUMENTS

| CN | 205273363 U | 6/2016 |
| CN | 205898835 U | 1/2017 |

(Continued)

*Primary Examiner* — Christopher P McAndrew
*Assistant Examiner* — Zannatul Ferdous
(74) *Attorney, Agent, or Firm* — Brooks Kushman P.C.; Ray Coppiellie

(57) ABSTRACT

The disclosure relates to a wheel speed sensor comprising a sensor element, which has a rotation detection element for electromagnetic detection of a speed of a wheel, in particular of a motor vehicle, and a sensor housing enclosing the rotation detection element and a fastening element, which has a fastening opening for vehicle-side fastening of the wheel speed sensor. The sensor element is enclosed by a guide sleeve that guides and/or aligns and/or positions the rotation detection element, wherein the guide sleeve is detachably connected to the sensor element and fixable inside a receptacle of the fastening element.

18 Claims, 2 Drawing Sheets

(56) References Cited

U.S. PATENT DOCUMENTS

| | | | |
|---|---|---|---|
| 2015/0070004 A1* | 3/2015 | Lerchenmueller | F01D 17/06 |
| | | | 324/207.25 |
| 2015/0204898 A1* | 7/2015 | Noda | G01P 1/00 |
| | | | 73/493 |
| 2018/0229550 A1* | 8/2018 | Yang | B60T 8/171 |

FOREIGN PATENT DOCUMENTS

| | | |
|---|---|---|
| DE | 102009054521 A1 | 2/2011 |
| DE | 202011104512 U1 | 11/2011 |
| JP | 2008268016 A | 11/2008 |
| JP | 2015141129 A | 8/2015 |
| KR | 20150093008 A | 8/2015 |

\* cited by examiner

WHEEL SPEED SENSOR

CROSS-REFERENCE TO RELATED APPLICATIONS

This application claims foreign priority benefits under 35 U.S.C. § 119(a)-(d) to DE Application 10 2017 213 642.1 filed Aug. 7, 2017, which is hereby incorporated by reference in its entirety.

TECHNICAL FIELD

The disclosure relates to a wheel speed sensor for a measurement, preferably electromagnetic measurement of a speed of a wheel, in particular of a motor vehicle.

BACKGROUND

To assist an automobile driver in managing increasing complexity and demands in road traffic, modern motor vehicles have a variety of different driver assistance systems. In principle, vehicle-related or road-traffic-related data are detected in these systems, analyzed, and used to control corresponding vehicle systems. Detection of the relevant data takes place via sensors. Using driver assistance systems such as anti-slip regulation (ASR), for example, spinning of wheels during startup of a vehicle is prevented, and locking of the wheels during braking is prevented with an antilock braking system (ABS). Sensors are widely used for this purpose for exact detection of a speed of the wheels of the motor vehicle.

A measurement of the speed of a wheel is performed in a contactless manner by detecting magnetic field fluctuations, which are caused by a rotation of a detection object or sensor rotor, for example an increment wheel, a ferromagnetic gearwheel, or a pole wheel, which rotates jointly with the respective wheel. The actual wheel speed sensor for detection of the magnetic field position is arranged so as to be stationary at a small distance from the sensor rotor.

Wheel speed sensors are differentiated on the basis of a mode of operation thereof into active and passive sensors. Inductive, passive sensors do not require a separate power supply. An inductive sensor has a coil and a permanent magnet, a magnetic effect of which extends up to an increment wheel. Rotational movement of the increment wheel and alternation of tooth and tooth gap linked thereto causes a change of the magnetic field. This change induces a measurable AC voltage. A frequency and amplitude of this AC voltage are proportional to a wheel speed.

In contrast to the passive wheel speed sensor, the active wheel speed sensor is supplied with a defined voltage. The active sensor supplies a signal having speed-independent constant amplitude and uses the Hall effect in detection of the speed signal. Ferromagnetic gearwheels, stamped plates or wheels having applied multi-poles, for example, are used as the detection object or sensor rotor.

Wheel speed sensors are typically arranged closely adjacent to the wheel, a velocity of which is to be measured, and to a corresponding transmission. There is an increased risk of corrosion in this environment. An array of protective casings and/or guide sleeves for the sensor head and/or the transition between sensor head and wiring harness of a wheel speed sensor are already known from the prior art.

An electromagnetic wheel speed sensor having a sensor head, a gearwheel and a cable is known, for example, from CN 205898835 U. The sensor head has a permanent magnet, a pole axis, and an inductive coil for measuring and generating an electromagnetic field. An output cable is guided by means of a cable conduit to a connecting part of a fastening aid and connected to an automobile body via an articulated connecting part.

CN 205273363 U discloses a connecting arrangement made of a wheel speed sensor and a wiring harness. Connection between the wiring harness and the wheel speed sensor includes injection-molded parts, wherein a section of a sensor head is enclosed using a casing. The casing includes protective sections that enclose the connection between the wiring harness and the sensor head. The probability of cable fractures can be reduced by means of a connecting arrangement, whereby reliability of the wheel speed sensor increases.

A wheel speed sensor comprising a rotation detection element for detecting a magnetic field fluctuation, which is caused by the rotation of a rotor, which rotates together with wheels of a vehicle, and is used as a detection object, is also known from JP 2015 141 129 A. The detected rotation is converted into an electrical signal and relayed by means of conductor sections of a rotation detection element to output wires. The output wires are encased by a cover part and countersunk therein, to ensure water tightness. The cover part is integrally embodied with a fixation part, which is used for a vehicle-side fixation of the wheel speed sensor. A seal element and a tubular element are arranged on the side of the fixation part facing away from the sensor head.

A metallic protective casing for a resin cover of a wheel speed sensor is known from JP 2008 268 016 A. The metallic protective casing is used to avoid damage that can arise due to collisions, adhesion, or movements of solids on the resin cover of the wheel speed sensor. The protective casing is designed to enclose the resin cover of a signal-detecting section of the wheel speed sensor. In particular, in a region of a rotating sensor rotor, detachment of particles can occur, in particular iron powder, which can move because of rotation of the sensor rotor and collide with the signal-detecting section. The signal-detecting section is therefore enclosed by the metallic protective casing, which is in turn connected to a provided wheel speed sensor.

KR 2015 009 3008 A discloses a wheel speed sensor comprising a speed sensor unit, within which a cable is connected to a speed sensor of a vehicle. An upper and a lower housing, which have an inner receptacle groove for accommodating the speed sensor unit, are embodied separately from one another. The upper housing may be detachably connected to the lower housing. In this manner, the same protective housing can be used to accommodate the wheel speed sensor independently of the structural design of a signal wheel and a vehicle-side fixation structure.

The wheel speed sensor, which is produced from plastic, typically does not itself corrode, however. Above all, a receptacle section, to which the wheel speed sensor is typically connected, is often subjected to corrosion. In particular, in wheel speed sensors that require a guide (lateral measurement sensors), this risk is increased. The guide functions are subjected to increased corrosion during assembly and be scratched or damaged in another manner. In this way, a removal of the wheel speed sensor is often only performed with damage up to destruction of the sensor or is even completely impossible.

DE 10 2009 054 521 A1 discloses a fastening device to fasten a speed sensor housing of a wheel speed sensor on a vehicle. For this purpose, an adapter is provided, comprising a cylindrical main part, on one end of which a fastening flange protrudes laterally. The fastening flange has a borehole, so that the adapter can be fastened by means of a screw on the vehicle. The sensor housing is provided on its outer side with two flattened areas, which form a twist lock with corresponding inner faces of the cylindrical main part of the adapter, to secure the wheel speed sensor in an exact alignment in relation to the sensor wheel.

In consideration of the prior art shown, wheel speed sensors still offer room for improvements.

SUMMARY

The disclosure is based on the object of proposing a wheel speed sensor, which can be replaced and/or maintained easily.

It is to be noted that the features and measures listed individually in the following description can be combined with one another in any arbitrary, technically reasonable manner and can disclose further embodiments of the disclosure. The description additionally characterizes and specifies the disclosure in particular in conjunction with the Figures.

The wheel speed sensor has a sensor element and a fastening element. A rotation detection element of the sensor element is enclosed by a sensor housing and is used for detection, in particular electromagnetic detection, of a speed of a wheel, in particular of a motor vehicle. The wheel is provided for this purpose with a sensor rotor, rotation of the sensor rotor generates fluctuations of an electromagnetic field. The rotation detection element is arranged adjacent to and spaced apart from the sensor rotor to detect the electromagnetic fluctuations. To fasten the sensor element on a vehicle side, for example on an axle part of a vehicle, the fastening element has a fastener, for example a passage borehole that accommodates, for example, a screw.

According to the disclosure, the sensor element is enclosed by a guide sleeve that guides and/or aligns and/or positions the rotation detection element. In particular, the guide sleeve is additionally used for protecting a sensor housing and/or the rotation detection element from scratches, impacts, etc.

The guide sleeve is designed, for example, as a ring or sleeve having a cylindrical basic shape and a passage opening. The sensor element is arranged inside the guide sleeve, for example inside the passage opening, and is detachably connected to the guide sleeve. The connection between the guide sleeve and the sensor element is preferably formed such that it does not detach during any possible transportation or other handling, before the wheel speed sensor is connected to the wheel of a vehicle for operation. The guide sleeve is fixable inside a receptacle of the fastening element for the purpose of installing the wheel speed sensor. This means the guide sleeve, having the sensor element located therein, may be introduced into the receptacle of the fastening element and fixed therein, wherein the guide sleeve can be guided, aligned and/or positioned by the receptacle.

The guide sleeve is fixable inside the receptacle such that the guide sleeve does not detach between the guide sleeve and the fastening element during removal of the wheel speed sensor, in particular for maintenance, repair, and/or for replacement of individual components. Instead, connection between the sensor element and guide sleeve may be detached, such that the sensor element is removable, while the guide sleeve remains together with the fastening element in an installed state. This enables a destruction-free and/or damage-free maintenance or replacement of the sensor element, since corrosion-related influences can be precluded during installation and removal.

According to one preferred embodiment, the guide sleeve is detachably fixable inside the receptacle of the fastening element by a form fit and/or friction lock, wherein the receptacle of the fastening element and the guide sleeve are designed in particular for unique positioning and/or alignment of the rotation detection element. For example, a distance and/or an alignment of the rotation detection element in relation to a vehicle-side sensor rotor can be settable via nubs, latches, and associated recesses, using guide webs and slots, a stop edge and/or congruent surfaces, which are each arranged complementary to one another on the guide sleeve and the recess of the fastening element. At the same time, the detachably fixing the guide sleeve inside the receptacle of the fastening element may be used as a twist, tilt, and/or displacement lock.

The receptacle of the fastening element is designed in a preferred embodiment as a through receptacle opening. The guide sleeve is insertable in a formfitting manner into the receptacle opening and is fixable, for example, via a friction lock inside the receptacle opening.

If the guide sleeve comprises a corrosion-resistant material, in particular plastic, and/or is coated using such a material or is produced from such a material, a corrosion-related sticking and/or jamming between the guide sleeve and the sensor housing, which is preferably also produced from plastic, can be prevented. The connection between sensor housing and guide sleeve may therefore be detached in a simple manner, whereby the sensor housing is removable from a passage opening of the guide sleeve.

For an advantageous fixation with the fastening element, the guide sleeve has a fastening-side protruding section. An outer face or outer circumferential geometry of the protruding section corresponds to an inner face or inner circumferential geometry of the receptacle opening of the fastening element, so that a protruding section may be clamped or tensioned inside the receptacle opening. Furthermore, it is advantageous if the outer circumferential geometry of the protruding section and the inner circumferential geometry of the receptacle opening are formed asymmetrically, so that the rotation detection element, indirectly via the guide sleeve, can be aligned and/or positioned uniquely, i.e., in a specific position in relation to the sensor rotor.

Because the fastening element is used to align the guide sleeve, a function of the guide sleeve is decoupled from a usability of the fastening element. The receptacle opening of the fastening element is not designed directly for aligning and guiding a sensor housing, but rather for aligning and guiding the guide sleeve, whereby positioning of the sensor element and/or rotation detection element is only caused indirectly by the receptacle opening of the fastening element.

Further advantageous embodiments of the disclosure is disclosed in the following description of the Figures.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different Figures, identical parts are always provided with the same reference signs, because of which they are generally also only described once.

Figure 1:
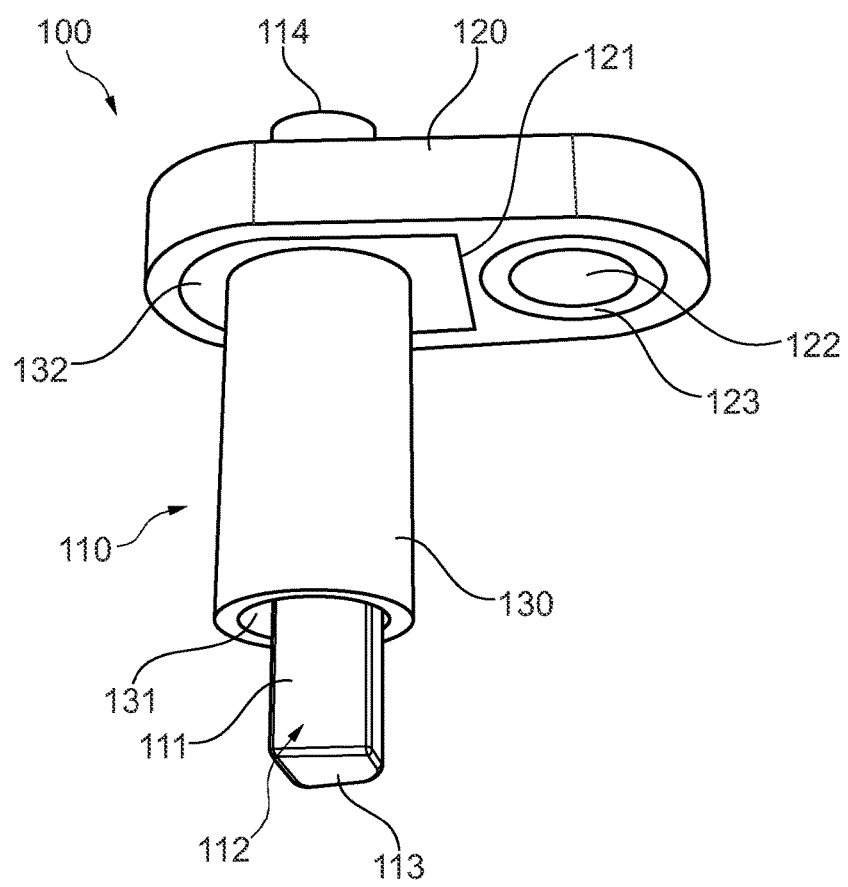
FIG. 1 shows a schematic illustration of an exemplary embodiment of a wheel speed sensor according to the disclosure having a fixed guide sleeve.

FIG. 1 depicts a schematic illustration of an exemplary embodiment of a wheel speed sensor 100 according to the disclosure, comprising a sensor element 110 and a fastening element 120. The sensor element 110 has a sensor housing 111 and a rotation detection element 112 arranged therein. The rotation detection element 112 is arranged inside a wheel-side end 113 of the sensor housing 111 to detect magnetic field fluctuations, which are caused by a sensor rotor (not shown). An opposite peripheral end 114 of the sensor housing 111 is used to accommodate cables and/or a wiring harness to relay a signal detected by the rotation detection element 112. A guide sleeve 130 is arranged coaxially to the sensor housing 111, wherein the sensor housing 111 penetrates a passage opening 131 of the guide sleeve 130. The guide sleeve 130 and the sensor housing 111 are detachably connected to one another. The guide sleeve 130 additionally has a protruding section 132, which is arranged at a wheel-side end of the guide sleeve 130. The rotation detection element 112 protrudes beyond a sensor-side end of the guide sleeve 130.

The fastening element 120 has a receptacle opening 121 and a fastening opening 122. The fastening opening 122 is preferably of circular form so as to accommodate a screw, which the wheel speed sensor 100 is fastenable in particular on an axle of a vehicle. An inner sleeve 123 for corrosion protection and/or a seal, or with a similar function, can be arranged inside the fastening opening 122. The receptacle opening 121 is preferably formed so as to penetrate the fastening element 120. The protruding section 132 is arranged inside the receptacle opening 121, wherein the receptacle opening 121 is completely filled by the protruding section 132.

Figure 2:
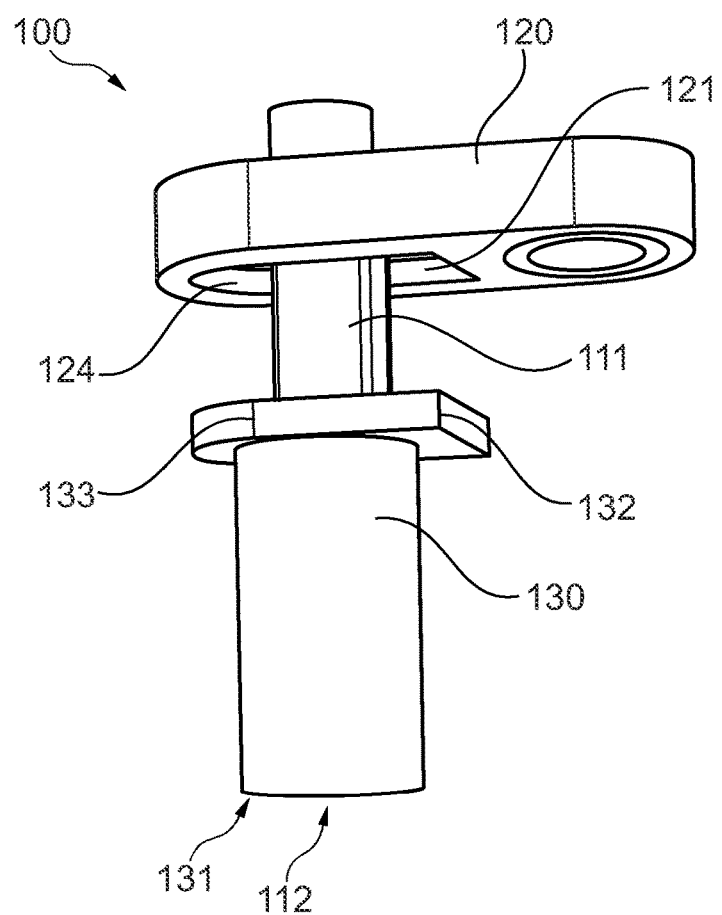
FIG. 2 shows a schematic illustration of the exemplary embodiment of a wheel speed sensor according to the disclosure as shown in FIG. 1 having a detached guide sleeve.

The illustration according to FIG. 2 shows the exemplary embodiment of a wheel speed sensor 100 according to FIG. 1, wherein the guide sleeve 130 is not fixed inside the receptacle opening 121, but rather is arranged vertically offset in relation thereto. It can be seen by way of example that a circumferential shape of an outer face 133 of the protruding section 132 is formed so as to be asymmetrical and U-shaped. A circumferential shape of an inner face 124 of the receptacle opening 121 is also formed so as to be asymmetrical and U-shaped in a manner complementary to the outer face 133, so that an alignment of the guide sleeve 130 is only possible in a single, specific positioning inside the receptacle opening 121. In this manner, the sensor housing 111, having the rotation detection element 112 contained therein, can be arranged and/or aligned in a specific position in relation to a sensor rotor (not shown) directly via the guide sleeve 130 or indirectly via the fastening element 120.

To remove the wheel speed sensor 100, a connection between the guide sleeve 130 and the sensor housing 111 is detached, wherein the guide sleeve 130 remains fixed inside the receptacle opening 121 (see in this regard FIG. 1). The sensor housing 111 can, subsequently, be removed from the passage opening 131 of the guide sleeve 130, whereby an alignment of the guide sleeve 130 is maintained upon re-installation and/or does not have to be performed again.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A wheel speed sensor comprising:
   a sensor element having a rotation detection element that electromagnetically detects a speed of a vehicle wheel and a sensor housing that encloses the rotation detection element;
   a fastening element that defines a fastening opening and a receptacle opening spaced apart therefrom, the receptacle opening defined by an inner face of the fastening element as an asymmetrical shape; and
   a guide sleeve enclosing the sensor element and that guides, aligns and positions the rotation detection element, the guide sleeve being detachably connected to the sensor element, the guide sleeve having a fastening-side protruding section with an outer face defining a complementary asymmetrical shape, the outer face of the fastening-side protruding section interacting in a formfitting and/or friction-locked manner with the inner face of the receptacle opening such that the fastening-side protruding section is fixable inside the receptacle opening of the fastening element and the rotation detection element can be aligned and/or positioned uniquely.

2. The wheel speed sensor as claimed in claim 1, wherein the fastening-side protruding section of the guide sleeve is detachably fixable inside the receptacle opening of the fastening element with a form-fit, friction lock.

3. The wheel speed sensor as claimed in claim 1, wherein the guide sleeve comprises a corrosion-resistant material.

4. A vehicle wheel comprising:
   a housing that encloses a sensor having a rotation detection element that electromagnetically detects a wheel speed; and
   a guide sleeve that encloses and is detachably connected to the sensor, and guides, aligns and positions the rotation detection element, the guide sleeve having a protruding section extending outwardly therefrom, the protruding section with a circumferential outer face; and
   a fastening element having an inner face circumferentially defining a receptacle opening in the fastening element, wherein the protruding section of the guide sleeve is fixable inside the receptacle opening of the fastening element, wherein the outer face of the protruding section is friction-locked with the inner face of the receptacle opening.

5. The vehicle wheel as claimed in claim 4, wherein the protruding section of the guide sleeve is detachably fixable inside the receptacle opening of the fastening element with a form-fit, friction lock.

6. The vehicle wheel as claimed in claim 4, wherein the inner face of the receptacle opening defines an asymmetrical shape to uniquely position and align the rotation detection element.

7. The vehicle wheel as claimed in claim 4, wherein the protruding section of the guide sleeve is insertable in a formfitting manner into the receptacle opening.

8. The vehicle wheel as claimed in claim 4, wherein the guide sleeve is formed from a plastic.

9. A vehicle wheel speed sensor comprising:
   a fastening element defining a fastening opening and a receptacle opening spaced apart therefrom, the fastening opening sized to receive a fastener to connect the fastening element to a vehicle;
   a sensor housing enclosing a sensor element with a rotation detection element configured to electromagnetically detect a speed of a vehicle wheel; and
   a guide sleeve having a first end region and a second end region, the first end region of the guide sleeve having a protruding section extending outwardly therefrom, wherein the protruding section of the guide sleeve is received within the receptacle opening to connect the guide sleeve to the fastening element, wherein the sensor element is detachably connected to the guide sleeve, wherein the guide sleeve is arranged circumferentially about the sensor element and guides, aligns, and positions the rotation detection element therein.

10. The vehicle wheel speed sensor as claimed in claim 9, wherein the protruding section of the guide sleeve extends outwardly from the guide sleeve to a circumferential outer face, the outer face spaced apart from the guide sleeve; and
   wherein the receptacle opening of the fastening element is defined by an inner face of the fastening element, wherein the inner face is shaped to mate with the outer face.

11. The vehicle wheel speed sensor as claimed in claim 10 wherein the outer face of the protruding section is sized for friction fit with the inner face of the receptacle opening to retain the guide sleeve relative to the fastening element.

12. The vehicle wheel speed sensor as claimed in claim 10 wherein a circumferential shape defined by the outer face is asymmetrical; and
   wherein a circumferential shape defined by the inner face is asymmetrical and complementary to the outer face.

13. The vehicle wheel speed sensor as claimed in claim 12 wherein a circumferential shape of the outer face is U-shaped.

14. The vehicle wheel speed sensor as claimed in claim 12 wherein a circumferential shape of the inner face is U-shaped.

15. The vehicle wheel speed sensor as claimed in claim 10 wherein the fastening element is defined by a first face and a second opposite face, the inner face of the receptacle opening extending between and intersecting the first and second faces.

16. The vehicle wheel speed sensor as claimed in claim 10, wherein the protruding section of the guide sleeve is detachably fixable inside the receptacle opening of the fastening element with a form-fit, friction lock.

17. The vehicle wheel speed sensor as claimed in claim 10, wherein the outer face of the protruding section is friction-locked with the inner face of the receptacle opening.

18. The vehicle wheel speed sensor as claimed in claim 9 wherein the guide sleeve has a cylindrical tube extending from the protruding section to the second end region.

* * * * *